United States Patent Office 3,669,613
Patented June 13, 1972

3,669,613
METHOD FOR INHIBITING SULFIDE CRACKING OF METALS WITH A HYDROGEN SULFIDE-ALDEHYDE REACTION PRODUCT
John A. Knox, Bill R. Keeney, and Reginald M. Lasater, Duncan, Okla., assignors to Halliburton Company, Duncan, Okla.
No Drawing. Continuation-in-part of application Ser. No. 615,323, Feb. 13, 1967. This application Apr. 27, 1970, Ser. No. 32,356
Int. Cl. C23f 11/16, 11/04
U.S. Cl. 21—2.7
14 Claims

ABSTRACT OF THE DISCLOSURE

Inhibition of hydrogen sulfide cracking in ferrous metals is gained through the use of the reaction product of an aldehyde and hydrogen sulfide prepared in the presence of an acid wherein the reaction product may be formed in situ, added to a hydrogen sulfide containing environment or coated on a ferrous metal before it is exposed to such an environment.

---

This is a continuation-in-part of application Ser. No. 615,323, filed Feb. 13, 1967, now abandoned.

The present invention relates generally to the prevention of sulfide cracking of ferrous metals in a hydrogen sulfide containing environment.

Sulfide cracking is a form of metal failure which is different from, and not necessarily related to normal corrosion, and which may occur even in the absence of substantial oxidation, hydrogen generation, metal removal, etc. Sulfide cracking normally occurs in metals under an applied or a residual stress, due to, for example, cold working. It has been observed that sulfide cracking occurs even though a metal is inhibited against normal corrosion. Thus, it has been found that normal corrosion inhibitors are relatively ineffective in the prevention of sulfide cracking.

Sulfide cracking is evidenced by cracks or fissures which appear on the surface of stressed metal upon exposure to a hydrogen sulfide containing environment. After the cracks occur, the metal exhibits greatly reduced strength in the area of the crack and tends to break apart upon continued application of stress. Although sulfide cracking is not completely understood, it is thought that free hydrogen atoms enter the stressed metal and lodge between the metal's grain boundaries and then combine to form molecular hydrogen, exerting a great force from within the surface of the metal. It can readily be seen that this is a process different from ordinary ferrous metal corrosion and tests show that metals which are effectively protected from corrosion by the existing corrosion inhibitors are still vulnerable to hydrogen sulfide cracking, the corrosion inhibitors providing no apparent resistance to the cracking phenomenon.

Hydrogen sulfide cracking is sometimes referred to as hydrogen sulfide embrittlement, a term deriving from one explanation of the little understood phenomenon. Hydrogen sulfide cracking will be referred to as sulfide cracking hereafter.

The present invention provides a sulfide cracking inhibitor comprising the reaction product of an aldehyde and hydrogen sulfide in the presence of a strong acid and the method of its use.

In general, any aldehyde may be used in this invention. Thus, suitable aldehydes include alkyl aldehydes, aryl aldehydes and alkylaryl aldehydes. The aldehydes may be substituted with nondeleterious substitutents such as hydroxyl groups and may be saturated or unsaturated. Suitable aldehydes include formaldehyde, benzaldehyde, butyraldehyde, β-hydroxy butyraldehyde (aldol), propionaldehyde, and glyoxal.

The preferred aldehyde is aldol (β-hydroxy butyraldehyde). Aldol is preferred because its reaction product with hydrogen sulfide in the presence of an acid is readily soluble in most solvents, whereas the reaction product made with formaldehyde is not readily soluble.

A variety of nonoxidizing acids stronger than hydrogen sulfide may be used in the present invention although hydrochloric acid is preferred. Thus, useful acids are hydrochloric acid, acetic acid, sulfuric acid, or any nonoxidizing, water soluble acid stronger than hydrogen sulfide.

In the present invention, hydrogen sulfide may be used in its gaseous state, or it may be obtained from a hydrogen sulfide source, e.g., ferrous sulfide, or from any other chemical that will react with the acid to release hydrogen sulfide which can react with the aldehyde. Suitable sources of hydrogen sulfide are thioacetamide and sodium sulfide.

The concentration of the acid should be from about 0.1% by weight to about 30% by weight. Cracking inhibition is noted with an aldol-$H_2S$ reaction product prepared in an acid concentration of only about 0.1% by weight, and no substantial improvement is noted when the acid concentration is increased to more than about 30% by weight. In addition, it is noted that a reaction product made in a hydrochloric acid concentration of about 30% was more slowly soluble in a solvent. Therefore, the acid concentration of from about 5% to about 15% is preferred.

The pH of the acid must be less than about 4.0 and preferably below 3.0. The most preferred pH range is between about −0.8 pH and 0 pH. Stated differently, the acid concentration should be between about 6 normal and about 1 normal.

When preparing the reaction product, a wide range of acid to aldehyde ratios may be used. Typical ranges of acid to aldehyde by volume are from about 10:1 to about 1:10. Although there is no preferred ratio, it has been noted that a greater volume and percent yield of reaction product is formed at ratios approaching 1:1.

After the aldehyde and acid have been mixed, hydrogen sulfide gas from a gas source, or from a chemical such as ferrous sulfide which will produce hydrogen sulfide gas, is bubbled through the solution. The gas bubbled into the solution will be absorbed by and react with the solution until the reaction has reached completion. The reaction usually reaches completion in from about 5½ hours to about 9½ hours at ambient temperatures.

The reaction should take place at about room temperature. The reaction should not be attemped at temperatures greater than about 45° C. No lower limit to the ambient temperature at which the reaction will take place has been found. The reaction has been performed at temperatures as low as −5° C.

The reaction product is not thoroughly understood, although it is thought to be made up primarily of trithioaldehyde and polymers thereof. It has been shown that the reaction product made using aldol as a source of aldehyde can be divided into a variety of molecular weight ranges between about 152 and about 734. The reaction product made with aldol is taken here as a representative sample and is not intended to limit the scope of the invention to the molecular weight ranges of the reaction product obtained with this particular aldehyde.

The higher molecular weights and the lower molecular weights of the reaction product have been shown to provide only limited sulfide inhibition, while the broad middle range of molecular weights of the reaction product provides some sulfide cracking inhibition. The portion of the reaction product having the molecular weight of about 270 to about 290 gives the greatest amount of sulfide cracking inhibition of any single molecular weight of the reaction product when tested separately. It is shown that cracking inhibition is provided by the synergistic action of a combination of all the constituents of the molecular weight range of the reaction product, constituting the entire reaction product. The entire reaction product provides sulfide cracking inhibition of about 10% greater efficiency than does the broad middle range of molecular weights of the reaction product and an efficiency of about 80% over the fraction of the reaction product having a molecular weight of about 270 to about 290.

The reaction product of an aldehyde and hydrogen sulfide prepared in the presence of a strong acid provides hydrogen sulfide cracking inhibition when present in only small amounts. Cracking inhibition has been shown to occur when the reaction product is present in a concentration of about 10 parts per million (p.p.m.), although a preferred concentration for most applications is from about 300 p.p.m. to about 400 p.p.m. The preferred concentration varies depending upon the application; for example, about 10 p.p.m. will provide sulfide cracking inhibition when a solution containing the reaction product is wiped on wire line which is then exposed to a hydrogen sulfide containing environment, while a concentration of about 1% (about 10,000 p.p.m.) is preferred in drilling mud for oil field applications where downhole casing and drilling tools are sought to be protected from subterranean hydrogen sulfide gas.

The reaction product may be applied to the hydrogen sulfide environment in an aromatic solvent, in an alcohol or in a combination of both, although methanol is the most frequently used solvent for the reaction product.

To prevent sulfide cracking metals, the reaction product is added to a hydrogen sulfide containing liquid which contacts the metal to be protected. For example, the reaction product may be added to a solution to be used in acidizing an oil well to protect the casing and tools from hydrogen sulfide cracking whenever hydrogen sulfide is present in a subterranean formation sought to be treated with an acid.

In addition, the reaction product may be formed in situ by adding the aldehyde to an environment in which the hydrogen sulfide and the acid are already present. For example, the reaction product may be formed downhole in an oil well by adding an aldehyde to an acid or to an acid corrosion inhibitor which is to be pumped into a well known to contain hydrogen sulfide.

Additionally, the reaction product may be used to protect metals from hydrogen sulfide cracking by coating the metals with the reaction product or an unctuous compound containing the reaction product prior to exposing the metal to a hydrogen sulfide containing environment.

It has also been discovered that the reaction product of the present invention has the unexpected effect of markedly increasing the efficiency of brine corrosion inhibitors. The reaction product exhibits an improved effect on the efficiency of the brine corrosion inhibitor when present in concentrations of from about 10 p.p.m. to about 10,000 p.p.m. Typical brine corrosion inhibitors to which the reaction product is added are:

Cronox–225, a commercial product of Milchem Chemical Corporation, and
Visco–936, a commercial product of Nalco Chemical Corporation.

The reaction product has also been found to have the unexpected effect of protecting certain acid corrosion inhibitors from hydrogen sulfide degradation. Certain acid corrosion inhibitors made from acetylenic alcohols and amines are rendered ineffective in the presence of hydrogen sulfide. However, the addition of the reaction product or of an aldehyde in an acid system to form the reaction product in situ has been discovered to protect the amines and the acetylenic alcohols from hydrogen sulfide degradation.

The invention will be further illustrated by the following examples. It should be understood, however, that although these examples may describe, in particular detail, some of the more specific features of the invention, they are given primarily for the purpose of illustration; and the invention, in its broader aspects is not to be construed as limited by the following examples.

EXAMPLE I

Test procedure

A sample of the reaction product is prepared by bubbling hydrogen sulfide gas through a solution of one part aldol and six parts 6 normal hydrochloric acid for 5½ hours at ambient temperature. Part of the reaction product is fractionated into twelve molecular weight ranges found in the reaction product. Each of the fractions, a sample of the entire reaction product and several combinations of various fractions are dissolved in methanol at a concentration of 10% by weight. The 10% reaction product—90% methanol solution is then added to a brine solution in a sufficient amount to have 350 p.p.m. of the reaction product present. The brine solution is then saturated with hydrogen sulfide gas and a wireline specimen, which has been prestressed to near its elastic limit, is placed into the inhibited sour brine solution. The following table shows the time interval between the first contact of wire line with the hydrogen sulfide containing (sour) brine and the instant at which the wire line was parted by hydrogen sulfide cracking. Table I below clearly shows the synergistic effect of the various fractions of the reaction product when combined as an improvement over the efficiency of the various fractions taken separately or in groups comprising less than the entire reaction product.

TABLE I

| | Average molecular weight of fraction | Hours to cracking |
|---|---|---|
| Fraction No.: | | |
| 1 | 733 | 5.6 |
| 2 | 530 | 7.7 |
| 3 | 565 | 5.3 |
| 4 | 367 | 6.7 |
| 5 | 266 | 8.4 |
| 6 | 274 | 5.0 |
| 7 | 279 | 15.1 |
| 8 | 268 | 10.4 |
| 9 | 146 | 5.3 |
| 10 | 153 | 5.8 |
| 11 | 161 | 8.9 |
| 12 | 152 | 7.3 |
| 2–10 | N/A | 24.3 |
| 1–2 | N/A | 5.35 |
| 11–12 | N/A | 7.3 |
| Unfractured reaction product | N/A | 27.0 |
| Blank (untreated wire line) | N/A | 5.7 |

EXAMPLE II

Test procedure

Wireline tests similar to those run in Example I, except using crotonaldehyde prepared at 0° C. and paraldehyde prepared at less than 5° C., to prepare the reaction product. The reaction products were then dissolved in methanol at a concentration of 10% by weight and added to the brine solution in a sufficient amount to have about 350 p.p.m. of the reaction product present. The brine solution is then saturated with hydrogen sulfide prior to immersion of the prestressed wire line. The results in Table II, below, show that reaction products prepared from both crotonaldehyde and paraldehyde exhibit some hydrogen sulfide cracking inhibition qualities, although neither of these aldehydes are as efficient as the aldol used in Example I.

TABLE II

| Reaction product prepared with: | Time to cracking, hrs. |
|---|---|
| Crotonaldehyde | 6.5 |
| Paraldehyde | 19.1 |
| Blank (untreated wire line) | 5.7 |

EXAMPLE III

Test procedure

A sample of the reaction product is made using six parts hydrochloric acid at each of the following strengths: 5% (pH<1), 10% (pH<1), 15% (pH<1), 30% (pH<1) and weak hydrochloric acid (pH=3), and one part aldol. Each sample of the reaction product is blended with solvent. The solvent-reaction product solutions are then added to the brine solutions in sufficient quantities to have 350 p.p.m. of the reaction product present. The brine solutions are saturated with hydrogen sulfide gas prior to immersion of the prestressed wire line. The interval between immersion and cracking is recorded for each sample. The test results shown in Table III, below, indicate the reaction product made at a pH 3 or lower will inhibit hydrogen sulfide cracking and that the reaction products made at lower pH provide greater hydrogen sulfide cracking inhibition.

TABLE III

| Acid strength used in preparation of reaction product | pH | Time to failure (H₂S cracking) |
|---|---|---|
| Weak hydrochloric acid | <3 | 2.5 days. |
| 5% hydrochloric acid | <1 | Intact after 14 days. |
| 10% hydrochloric acid | <1 | Do. |
| 15% hydrochloric acid | <1 | Do. |
| 30% hydrochloric acid | <1 | Do. |
| Blank (unprotected wire line) | | 5.7 hours. |

EXAMPLE IV

The synergistic effect of the reaction product of Example I when combined with brine corrosion inhibitors is demonstrated in this example. The reaction product is not an effective brine corrosion inhibitor when used alone, but remarkably improves the brine corrosion inhibition of common brine corrosion inhibitors, as indicated in Table IV. An instantaneous corrosion rate meter is connected with each of six sealed test cells containing metal electrodes in the presence of brine, brine with various brine corrosion inhibitors, the reaction product and combinations thereof as shown in Table IV. The test is run for 42 hours at a temperature of 150° F. in a 5% brine solution. The concentration of inhibitors and the reaction product is 250 p.p.m. Brine corrosion inhibitors used were Cronox-225 and Visco-936.

TABLE IV

[All readings are Corrosion Rate in mils/year]

| Test time, hrs. | No inhibitor | Reaction product | Cronox-936 | Visco-936 | Cronox-225 plus reaction product | Visco-936 plus reaction product |
|---|---|---|---|---|---|---|
| 1 | 124 | 104 | 18 | 14 | 6 | 5.0 |
| 2 | 72 | 70 | 14.8 | 8.4 | 3.6 | 3.6 |
| 18 | 22 | 20 | 8 | 4 | 2 | 2.4 |
| 23 | 8 | 8 | 6 | 4 | 2 | 2.4 |
| 42 | 4 | 4 | 2 | 4 | 2 | 2.4 |

EXAMPLE V

The reaction product of Example I has been found to protect acid corrosion inhibitors from hydrogen sulfide degradation. Tests are run for six hours each at 150° F. to determine the corrosion rate in pounds per square foot per day of 5% hydrochloric acid on AISI–1010 carbon steel in the presence of the following inhibitors both alone and when combined with the reaction product: Cronox–0515A, alkyl pyridines, Rodine–213, Rodine–203, MSA, and HAI–45. Table V shows the improved corrosion rate when the reaction product is added to the acid corrosion inhibitor.

TABLE V

[Corrosion rate in lbs./ft.²/day]

| Inhibitor | Corrosion rate with no H₂S present | Corrosion rate with H₂S present | Corrosion rate with reaction product added | |
|---|---|---|---|---|
| | | | Absent H₂S | Present H₂S |
| Cronox-0515A | 0.016 | 0.033 | 0.007 | 0.005 |
| Alkyl pyridines | 0.010 | 0.018 | 0.014 | 0.004 |
| Rodine-213 | 0.007 | 0.021 | 0.007 | 0.003 |
| Rodine-203 | 0.011 | 0.017 | 0.010 | 0.004 |
| MSA | 0.043 | 0.059 | 0.048 | 0.004 |
| HAI-45 * | 0.002 | 0.021 | | 0.008 |

*Note.—The test with HAI-45 (an acetylenic alcohol) was conducted on mild steel NA 15% hydrochloric solution.

It will be noted that many widely different embodiments of this invention may be made without departing from the spirit and scope thereof; therefore, it is not intended to be limited except as limited in the appended claims.

What is claimed is:

1. A method for protecting ferrous metals maintained in an environment selected from the group consisting of brine containing environments, acid containing environments, and mixtures thereof wherein said method consists essentially of contacting said metals with at least a sufficient quantity of the reaction product of an aldehyde and hydrogen sulfide required for the protection of said ferrous metals, wherein said reaction product is produced by the reaction of said aldehyde with said hydrogen sulfide at a temperature in the range of −5° C. to 45° C. and in the presence of a nonoxidizing acid having a pH not greater than 3 and further wherein said aldehyde is selected from the group consisting of formaldehyde, benzaldehyde, butyraldehyde, β-hydroxybutyraldehyde, propionaldehyde, glyoxal, crotonaldehyde, and paraldehyde.

2. The method of claim 1 wherein said acid containing environment is a hydrogen sulfide containing environment.

3. The method of claim 1 wherein said aldehyde is β-hydroxybutyraldehyde.

4. The method of claim 1 wherein said acid has a pH less than 1.

5. The method of claim 1 wherein said acid is hydrochloric acid.

6. The method of claim 1 wherein the production of said reaction product and said hydrogen sulfide is produced from a compound selected from those which form hydrogen sulfide upon contact with said acid.

7. The method of claim 6 wherein said compound is selected from the group consisting of ferrous sulfide, thioacetamide and sodium sulfide.

8. The method of claim 1 wherein said reaction product is formed in situ in said hydrogen sulfide containing environment wherein said aldehyde and said acid are added to said hydrogen sulfide containing environment.

9. The method of claim 8 wherein said aldehyde is mixed with acid corrosion inhibitors containing amines and acetylenic alcohol to form a mixture which is thereafter added along with said acid to said hydrogen sulfide containing environment.

10. The method of claim 1 wherein said reaction product is combined with a brine corrosion inhibitor, said reaction product being present in a concentration in the range of 10 to about 10,000 parts per million.

11. The method of claim 1 wherein said reaction product is combined with acid corrosion inhibitors containing amines and acetylenic alcohol.

12. The method of claim 1 wherein said acid and said aldehyde are mixed in quantities in the range of 10:1 to 1:10 parts by volume acid per parts by volume aldehyde to thus form an aldehyde-acid solution and thereafter said solution is contacted with a sufficient quantity of said hydrogen sulfide to thereby form said reaction product.

13. The method of claim 12 wherein said aldehyde is β-hydroxybutyraldehyde, and said acid is hydrochloric acid having a pH less than 1.

14. The method of claim 13 wherein said reaction product is present in said environment in an amount in the range of 10 to 10,000 parts per million.

References Cited

UNITED STATES PATENTS

| | | | |
|---|---|---|---|
| 2,605,223 | 7/1952 | Case | 253—8.55 E |
| 1,923,055 | 8/1933 | Lawrence | 252—148 |
| 3,094,490 | 6/1963 | Gardner et al. | 252—149 |
| 2,426,318 | 8/1947 | Menaul | 252—8.55 E |
| 2,496,594 | 2/1950 | Moyer et al. | 252—8.55 E |
| 2,955,083 | 10/1960 | Levin | 252—8.55 E |
| 3,077,454 | 2/1963 | Monroe et al. | 252—148 |
| 2,664,408 | 12/1953 | Plump et al. | 252—149 |
| 2,965,577 | 12/1960 | Heimann et al. | 252—148 |

HERBERT B. GUYNN, Primary Examiner

I. GLUCK, Assistant Examiner

U.S. Cl. X.R.

21—2.5; 106—14; 252—8.55 E, 146, 148, 392, 394, 395, 396

UNITED STATES PATENT OFFICE
CERTIFICATE OF CORRECTION

Patent No. 3,669,613　　　　　　　　Dated June 13, 1972

Inventor(s) John A. Knox, Bill R. Keeney, Reginald M. Lasater

It is certified that error appears in the above-identified patent and that said Letters Patent are hereby corrected as shown below:

In Column 6, Claim 6, line 2 thereof: delete the word "and".

In Column 6, Claim 8, line 1 thereof: delete the numeral "1" and insert therefor the numeral --2--.

Signed and sealed this 28th day of November 1972.

(SEAL)
Attest:

EDWARD M. FLETCHER, JR.　　　　　　　ROBERT GOTTSCHALK
Attesting Officer　　　　　　　　　　Commissioner of Patents